United States Patent
Motoyama et al.

(10) Patent No.: US 12,528,431 B2
(45) Date of Patent: Jan. 20, 2026

(54) IN-VEHICLE APPARATUS

(71) Applicant: SUBARU CORPORATION, Tokyo (JP)

(72) Inventors: Junichi Motoyama, Tokyo (JP); Yuto Aoki, Tokyo (JP); Tsukasa Mikuni, Tokyo (JP); Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 24 days.

(21) Appl. No.: 18/774,122

(22) Filed: Jul. 16, 2024

(65) Prior Publication Data
US 2024/0367600 A1 Nov. 7, 2024

Related U.S. Application Data

(63) Continuation of application No. PCT/JP2023/013229, filed on Mar. 30, 2023.

(51) Int. Cl.
*G01C 21/00* (2006.01)
*B60R 16/03* (2006.01)
(Continued)

(52) U.S. Cl.
CPC .............. *B60R 16/03* (2013.01); *B60L 58/12* (2019.02); *G01C 21/3697* (2013.01)

(58) Field of Classification Search
CPC ...... B60R 16/03; G01C 21/3697; B60L 58/12
See application file for complete search history.

(56) References Cited

U.S. PATENT DOCUMENTS

2016/0375862 A1* 12/2016 Ito ........................... B60R 25/30
  348/148
2017/0356747 A1* 12/2017 Iagnemma ......... G01C 21/3461
(Continued)

FOREIGN PATENT DOCUMENTS

| JP | 2009-171647 A | 7/2009 |
| JP | 2018-014062 A | 1/2018 |
| JP | 2020-190479 A | 11/2020 |

OTHER PUBLICATIONS

International Search Report received in PCT Application No. PCT/JP2023/013229, dated Jun. 13, 2023.

*Primary Examiner* — Adnan M Mirza
(74) *Attorney, Agent, or Firm* — Rimon P.C.

(57) ABSTRACT

An in-vehicle apparatus to be applied to a vehicle includes a navigator, an area information extractor that extracts data on a communication difficulty area, a battery residual capacity monitor that monitors a traveling battery residual capacity, a traveling mode selector that receives a selected traveling mode, a travel information manager that determines a communication state in a traveling direction of the vehicle based on the data received from the area information extractor, and calculates a possible traveling distance of the vehicle based on the selected traveling mode and the traveling battery residual capacity, and a notifier that notifies the occupant of travel information on the vehicle. When determining that the vehicle is to travel in the communication difficulty area, the travel information manager proposes a switch to a traveling mode in which the vehicle is able to pass through the communication difficulty area to the occupant via the notifier.

2 Claims, 7 Drawing Sheets

(51) Int. Cl.
*B60L 58/12* (2019.01)
*G01C 21/36* (2006.01)

(56) References Cited

U.S. PATENT DOCUMENTS

2020/0371773 A1* 11/2020 Kato .................. G01C 21/3885
2021/0262815 A1* 8/2021 Lee ..................... G01C 21/367

* cited by examiner

IN-VEHICLE APPARATUS

CROSS-REFERENCE TO RELATED APPLICATIONS

This application is continuation of International Application No. PCT/JP2023/013229, filed on Mar. 30, 2023, the entire contents of which are hereby incorporated by reference.

BACKGROUND

The disclosure relates to an in-vehicle apparatus.

In recent years, charging stations for electric vehicles have been popularized with the popularization of electric vehicles.

However, a sufficient number of charging stations for electric vehicles has not been secured yet, and there is a possibility that an own vehicle becomes difficult to travel due to a shortage of charging before reaching a charging station.

Therefore, position information on charging stations is to be acquired in advance before traveling in an electric vehicle.

To address this concern, Japanese Unexamined Patent Application Publication (JP-A) No. 2009-171647, for example, describes a power-saving driver assistance apparatus that reduces electric power consumption of an electric vehicle. The power-saving driver assistance apparatus includes an electric power consumption acquiring unit that acquires a power amount consumed by the electric vehicle per unit traveling distance, a residual capacity acquiring unit that acquires a residual capacity of a storage battery, a station distance acquiring unit that acquires a traveling distance from a current position to a charging station, a possible traveling distance calculating unit that calculates a distance that the electric vehicle is able to travel with the residual capacity based on the electric power consumption acquired by the electric power consumption acquiring unit and the residual capacity acquired by the residual capacity acquiring unit, and a power-saving necessity display unit that displays the possible traveling distance calculated by the possible traveling distance acquiring unit and the traveling distance to the charging station acquired by the station distance acquiring unit.

SUMMARY

An aspect of the disclosure provides an in-vehicle apparatus to be applied to a vehicle. The in-vehicle apparatus includes a navigator, an area information extractor, a battery residual capacity monitor, a traveling mode selector, a travel information manager, and a notifier. The navigator is configured to acquire a current position of the vehicle, provide map information on surroundings of the current position of the vehicle, and guide the vehicle along a determined traveling route. The area information extractor is configured to extract data on a communication difficulty area included in the map information. The communication difficulty area is an area in which a communication state is deteriorated. The battery residual capacity monitor is configured to monitor a traveling battery residual capacity of the vehicle. The traveling mode selector is configured to receive a selected traveling mode out of traveling modes. The travel information manager is configured to determine the communication state in a traveling direction of the vehicle based on the data received from the area information extractor, and calculate a possible traveling distance of the vehicle based on the selected traveling mode received by the traveling mode selector and the traveling battery residual capacity received from the battery residual capacity monitor. The notifier is configured to notify the occupant of travel information on the vehicle received from the travel information manager. When determining that the vehicle is to travel in the communication difficulty area or that the communication difficulty area is located on the determined traveling route, the travel information manager is configured to propose a switch to another of the traveling modes in which the vehicle is able to pass through the communication difficulty area to the occupant via the notifier. The travel information manager is configured to, when determining that the vehicle has passed through the communication difficulty area based on the data received from the area information extractor, notify the occupant of information indicating that the vehicle has passed through the communication difficulty area via the notifier. The travel information manager is configured to when determining, upon selection of a power-saving traveling mode in which electric power consumption of an electrical device in the vehicle is reduced as the selected traveling mode, that the vehicle is to travel in the communication difficulty area or that the communication difficulty area is located on the determined traveling route, and determining that it is difficult for the vehicle in the power saving traveling mode to pass through the communication difficulty area, propose a switch from the power-saving traveling mode to an emergency power-saving traveling mode in which the electric power consumption of the electrical device in the vehicle is further reduced.

An aspect of the disclosure provides an in-vehicle apparatus to be applied to a vehicle. The in-vehicle apparatus includes one or more processors, one or more memories communicably coupled to the one or more processors, and a notifier configured to notify an occupant of the vehicle of travel information on the vehicle. The one or more memories includes a recording unit configured to record map information on routes. The map information includes data on a communication difficulty area in which a communication state is deteriorated. The one or more processors include a navigator, an area information extractor, a battery residual capacity monitor, a traveling mode selector, and a travel information manager. The navigator is configured to acquire a current position of the vehicle, provide map information on surroundings of the current position of the vehicle, and guide the vehicle along a determined traveling route. The area information extractor is configured to extract the data on the communication difficulty area included in the map information. The battery residual capacity monitor is configured to monitor a traveling battery residual capacity of the vehicle. The traveling mode selector is configured to receive a selected traveling mode out of traveling modes. The travel information manager is configured to determine the communication state in a traveling direction of the vehicle based on the data received from the area information extractor, and calculate a possible traveling distance of the vehicle based on the selected traveling mode received by the traveling mode selector and the traveling battery residual capacity received from the battery residual capacity monitor. The travel information manager is configured to, when determining that the vehicle is to travel in the communication difficulty area or that the communication difficulty area is located on the determined traveling route, propose a switch to another of the traveling modes in which the vehicle is able to pass through the communication difficulty area to the occupant via the notifier. The travel information manager is configured to, when determining that the vehicle has passed through the communication difficulty area based on the data received from the area information extractor, to notify the occupant of information indicating that the vehicle has passed through the communication difficulty area via the notifier. The travel information manager is configured to, when determining, upon selection of a power-saving traveling mode in which electric power consumption of an electrical device in the vehicle is reduced as the selected traveling mode, that the vehicle is to travel in the communication difficulty area or that the communication difficulty area is located on the determined traveling route, and determining that it is difficult for the vehicle in the power saving traveling mode to pass through the communication difficulty area, propose a switch from the power-saving traveling mode to an emergency power-saving traveling mode in which the electric power consumption of the electrical device in the vehicle is further reduced.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
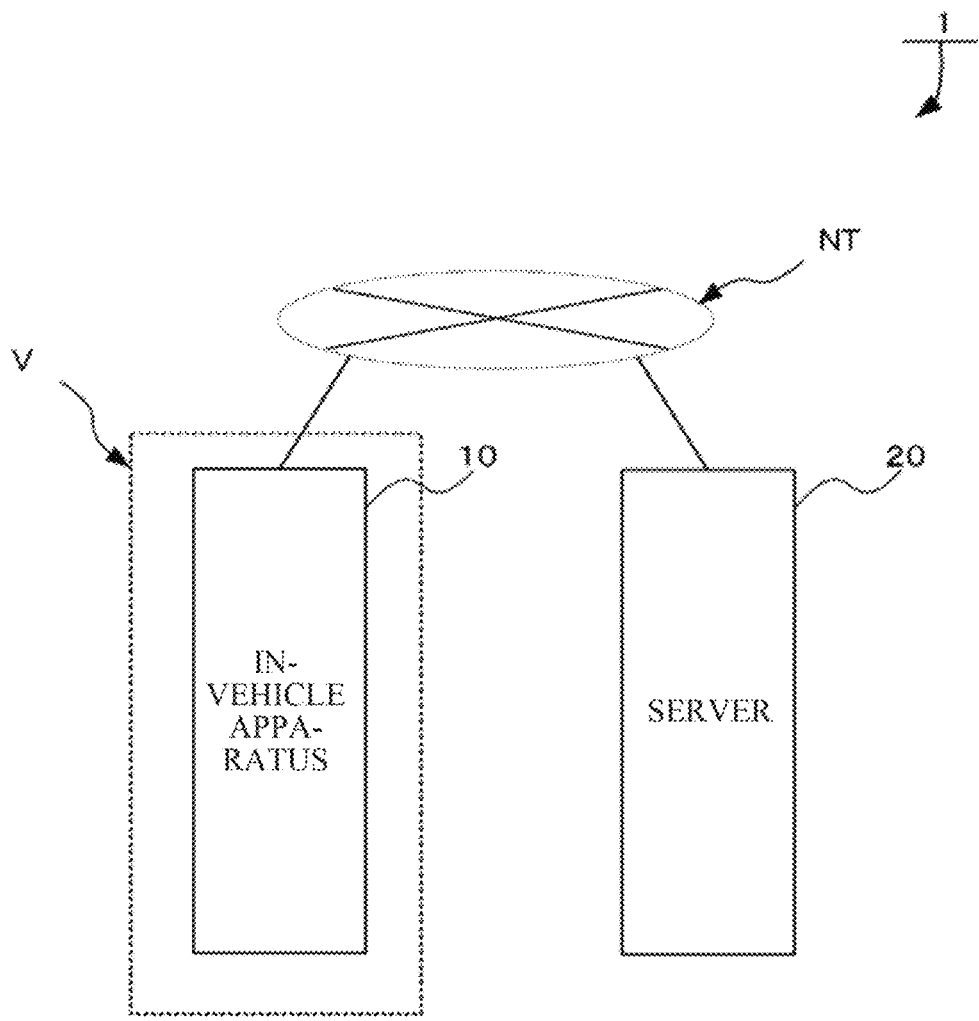
FIG. 1 is a diagram illustrating an exemplary configuration of a vehicle control system according to one example embodiment of the disclosure.

With the development in technology relating to driver assistance and automated driving, map information used for the driver assistance and the automated driving is having enormous data capacity as compared with map information for simple map display used in a navigation device or the like.

Due to the increase in the data capacity, the map information for the driver assistance and the automated driving is stored in a server or the like, and a vehicle-side component downloads and uses the map information or the like as map data from the server, as necessary.

With such a configuration, it is difficult to download the map information from the server in some cases when an own vehicle enters an area in which communication is difficult to be established.

According to the technique disclosed in JP-A No. 2009-171647, a traveling distance is calculated based on the acquired map information, and a possible traveling distance is calculated based on a residual capacity of a storage battery.

Therefore, when the own vehicle enters the area in which communication is difficult to be established, it is difficult to calculate the traveling distance to a charging station. This raises a concern that the residual capacity of a vehicle traveling battery of the own vehicle becomes insufficient.

It is desirable to provide an in-vehicle apparatus that makes it possible to reduce the electric power consumption of a vehicle traveling battery before the own vehicle enters an area in which communication is difficult to be established.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A vehicle control system according to some example embodiments will now be described with reference to FIGS. 1 to 7.

First Example Embodiment

A vehicle control system 1 according to a first example embodiment will now be described with reference to FIGS. 1 to 4.

In the following description, a vehicle (hereinafter also referred to as an own vehicle) V may be an electric vehicle that travels with a vehicle traveling battery BT.

<Vehicle Control System 1>

As illustrated in FIG. 1, the vehicle control system 1 according to the first example embodiment may include an in-vehicle apparatus 10 and a server 20.

The in-vehicle apparatus 10 may control an overall operation of the vehicle control system 1 based on a control program stored in a read-only memory (ROM) mounted in the in-vehicle apparatus 10.

Further, when it is determined that the own vehicle V is to travel in a communication difficulty area WR or that the communication difficulty area WR is located on a traveling route RA, for example, the in-vehicle apparatus 10 performs control to propose a switch to a traveling mode DM in which the own vehicle V is able to pass through the communication difficulty area WR to an occupant of the vehicle.

Details of the in-vehicle apparatus 10 will be described later.

The server 20 may be provided outside the own vehicle V, and may store, for example, data such as map information MI, surrounding area information, and traffic congestion information to be used in driver assistance control or automated driving control.

The server 20 and the in-vehicle apparatus 10 may be coupled to each other by wireless communication via a communication network NT such as a wireless communication base station, for example.

The server 20 may transmit the data to the in-vehicle apparatus 10 based on a request from the in-vehicle apparatus 10.

<In-Vehicle Apparatus 10>

Figure 2:
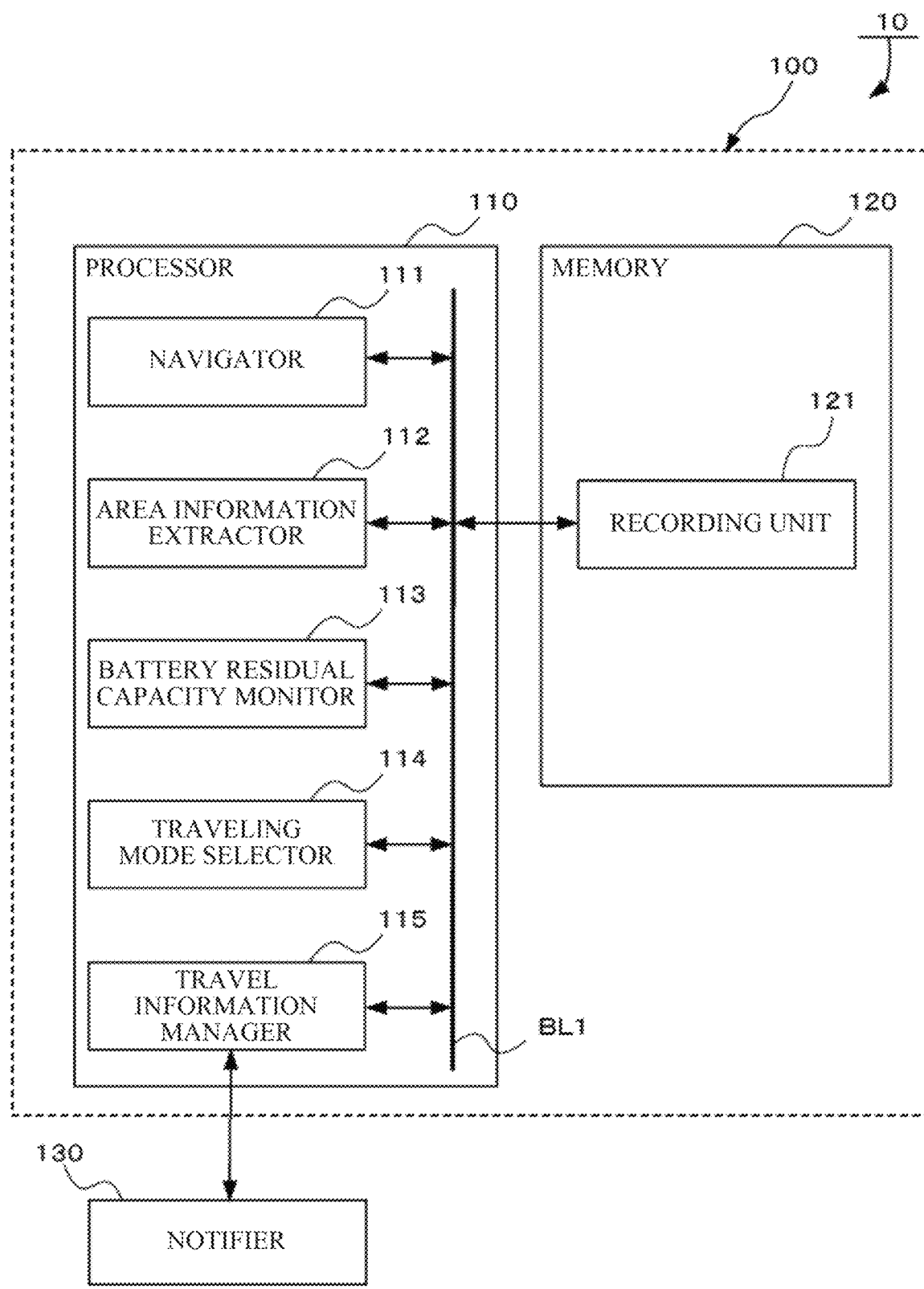
FIG. 2 is a block diagram illustrating an exemplary configuration of an in-vehicle apparatus according to one example embodiment of the disclosure.

As illustrated in FIG. 2, the in-vehicle apparatus 10 includes a processor unit 100 and a notifier 130.

<Configuration of Processor Unit 100>

The processor unit 100 include a processor 110 and a memory 120. The processor unit 100 may control an overall operation of the in-vehicle apparatus 10 based on a control program stored in a read-only memory (ROM) included in the memory 120.

The processor 110 includes a navigator 111, an area information extractor 112, a battery residual capacity monitor 113, a traveling mode selector 114, and a travel information manager 115. The memory 120 may include a recording unit 121.

The navigator 111, the area information extractor 112, the battery residual capacity monitor 113, the traveling mode selector 114, and the travel information manager 115 in the processor 110, and the memory 120 may be coupled to each other via a bus line BL1.

The navigator 111 guides the own vehicle V along the traveling route RA serving as determined route information.

In other words, the navigator 111 sets the traveling route RA from a current position of the own vehicle V to a destination based on the map information MI and traffic information TI received from the server 20, and guides the own vehicle V to the destination along the traveling route RA.

In addition, the navigator 111 may include, for example, a global positioning system (GPS) receiver to detect the current position of the own vehicle V based on electric waves received from the GPS satellites.

The information on the current position of the own vehicle V identified by the navigator 111 may be transmitted to the area information extractor 112, the battery residual capacity monitor 113, and the travel information manager 115 via the bus line BL1.

The area information extractor 112 extracts data on the communication difficulty area WR located in a traveling direction of the own vehicle V or included in the traveling route RA from the map information MI.

Figure 3:
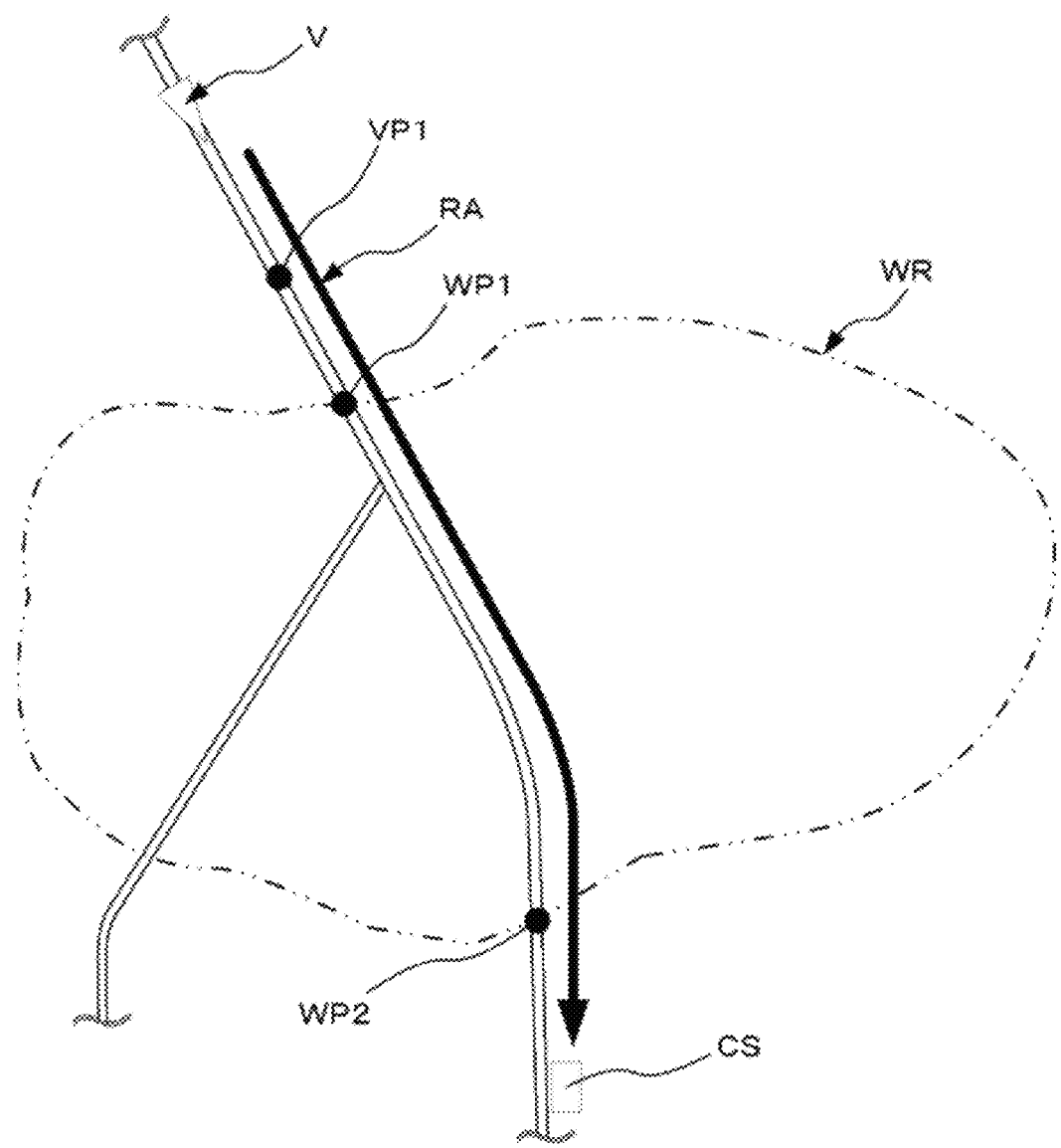
FIG. 3 is a diagram illustrating a traveling route of an own vehicle including the in-vehicle apparatus according to one example embodiment of the disclosure.

As illustrated in FIG. 3, when data on the communication difficulty area WR is included in the map information MI downloaded from the server 20, the area information extractor 112 extracts the data on the communication difficulty area WR from the map information MI, and may transmit the data on the communication difficulty area WR to the travel information manager 115 via the bus line BL1.

The area information extractor 112 may extract the data on the communication difficulty area WR by acquiring an electric field strength of an electric wave used for the wireless communication with the server 20 from the notifier 130.

For example, the area information extractor 112 may acquire, for example, the electric field strength of a transmission/reception electric wave or an error rate of communication data from the notifier 130.

The area information extractor 112 may determine whether the electric field strength or the error rate is greater than or equal to a predetermined value of the electric field strength or a predetermined value of the error rate of the communication data stored in advance in the memory 120, for example.

Thereafter, the area information extractor 112 may transmit a determination result to the travel information manager 115.

When the electric field strength or the error rate which is greater than or equal to the predetermined value becomes less than the predetermined value, the area information extractor 112 may transmit, for example, information indicating that the own vehicle V has entered the communication difficulty area WR to the travel information manager 115.

When the electric field strength or the error rate which is less than the predetermined value becomes greater than or equal to the predetermined value, the area information extractor 112 may transmit, for example, information indicating that the own vehicle V has passed through the communication difficulty area WR to the travel information manager 115.

The battery residual capacity monitor 113 monitors and acquires a traveling battery residual capacity BV of the vehicle traveling battery BT of the own vehicle V.

The battery residual capacity monitor 113 may transmit the acquired traveling battery residual capacity BV to the travel information manager 115.

The traveling mode selector 114 receives a selected traveling mode out of traveling modes DM.

The own vehicle V may have, as the traveling modes DM, traveling modes in which electric power consumption is reduced. The traveling mode selector 114 may be, for example, a switch with which the occupant selects a desired traveling mode.

The traveling mode selector 114 may switch the traveling mode DM between, for example, a normal traveling mode ND, a power-saving traveling mode ED, and an emergency power-saving traveling mode EE.

The normal traveling mode ND may be a mode in which the own vehicle V is controlled in accordance with a setting set by the occupant.

The power-saving traveling mode ED may be a mode in which electric power consumption is reduced by a larger amount than in the normal traveling mode ND.

For example, in the power-saving traveling mode ED, the electric power consumption of an electrical device such as an air conditioner, an audio device, or an illumination device disposed in the own vehicle V may be reduced.

For instance, in the power-saving traveling mode ED, the electric power consumption of the air conditioner may be reduced by changing a temperature setting and an air flow.

In addition, in the power-saving traveling mode ED, the electric power consumption of the illumination device may be reduced by, for example, reducing an illumination level of the illumination device of the own vehicle V.

The emergency power-saving traveling mode EE may be, for example, a mode in which the electric power consumption is further reduced by a larger amount than in the power-saving traveling mode ED. In the emergency power-saving traveling mode EE, the electric power consumption may be reduced or stopped while securing certain electric power necessary for the travel of the own vehicle V.

In the emergency power-saving traveling mode EE, the electric power consumption of the air conditioner may be further reduced by, for example, further changing or cancelling the temperature setting and the air flow.

In addition, in the emergency power-saving traveling mode EE, for example, control to stop a navigation device of the own vehicle V from displaying and to guide the own vehicle V using audio guidance may be performed. For example, in the emergency power-saving traveling mode EE, control to turn off a cruise control display, a following traveling speed display, an operation ON/OFF display, or the like on a meter panel may be performed while keeping a certain display necessary for the travel of the own vehicle V turned on.

The travel information manager 115 determines a communication state TS in the surroundings of the own vehicle V in the traveling direction of the own vehicle V based on the information received from the area information extractor 112. In addition, the travel information manager 115 calculates a possible traveling distance AD of the own vehicle V based on the traveling mode DM selected with the traveling mode selector 114 and the traveling battery residual capacity BV received from the battery residual capacity monitor 113.

The travel information manager 115 determines whether the communication difficulty area WR is located in the travel direction of the own vehicle V or on the traveling route RA, for example, based on the data received from the area information extractor 112.

When determining that the own vehicle V is to travel in the communication difficulty area WR or that the communication difficulty area WR is located on the traveling route RA, the travel information manager 115 proposes a switch to the traveling mode DM in which the own vehicle V is able to pass through the communication difficulty area WR to the occupant via the notifier 130.

In addition, when determining that the own vehicle V has passed through the communication difficulty area WR based on the data received from the area information extractor 112, the travel information manager 115 notifies the occupant of the information indicating that the own vehicle V has passed through the communication difficulty area via the notifier 130.

For example, when determining that the communication difficulty area WR is located in the traveling direction of the own vehicle V or on the traveling route RA, the travel information manager 115 may determine whether it is possible for the own vehicle V to pass through the communication difficulty area WR, based on the data on the communication difficulty area WR received from the area information extractor 112 and the calculated possible traveling distance AD of the own vehicle V.

For instance, as illustrated in FIG. 3, the travel information manager 115 may calculate a distance between a communication difficulty area entrance point WP1 to a communication difficulty area exit point WP2 as a communication difficulty area traveling distance WD. The communication difficulty area entrance point WP1 may be a point where the communication difficulty area WR and the traveling route RA intersect with each other first in the traveling direction of the own vehicle V. The communication difficulty area exit point WP2 may be an exit point of the communication difficulty area WR which the own vehicle V is to pass through.

Further, for example, the travel information manager 115 may compare the communication difficulty area traveling distance WD with the possible traveling distance AD to determine whether it is possible for the own vehicle V to pass through the communication difficulty area WR in the traveling mode DM currently selected.

When determining that it is difficult for the own vehicle V to pass through the communication difficulty area WR in the traveling mode DM currently selected, for example, the travel information manager 115 proposes a switch to another traveling mode DM, for example, the power-saving traveling mode ED in which the electric power consumption is further reduced.

In this case, the travel information manager 115 may notify the occupant of information on the nearest charging station CS from a current traveling position of the own vehicle V, for example.

Further, when determining that it is difficult for the own vehicle V to pass through the communication difficulty area WR even after switching the traveling mode DM, for example, the travel information manager 115 may notify the occupant that it is difficult for the own vehicle V to pass through the communication difficulty area WR at a point VP1 before the communication difficulty area entrance point WP1, for example.

The notifier 130 may display the traveling battery residual capacity BV of the own vehicle V based on travel information DI received from the travel information manager 115, and may notify the occupant of the possible traveling distance corresponding to the traveling battery residual capacity BV.

For example, the notifier 130 may notify the occupant of the own vehicle V of the travel information DI including the current position of the own vehicle V, the traveling route RA, a traveling distance, a travel speed, the traveling battery residual capacity BV, and the possible traveling distance corresponding to the traveling battery residual capacity BV, based on the information transmitted from the travel information manager 115, by means of displaying on a non-illustrated display, an audio signal, or the like.

Further, the notifier 130 may be provided with, for example, a non-illustrated in-vehicle communicator, and the in-vehicle communicator may communicate with the server 20 provided outside the own vehicle V by wireless communication under the control by the travel information manager 115.

<Process in In-Vehicle Apparatus 10>

Figure 4:
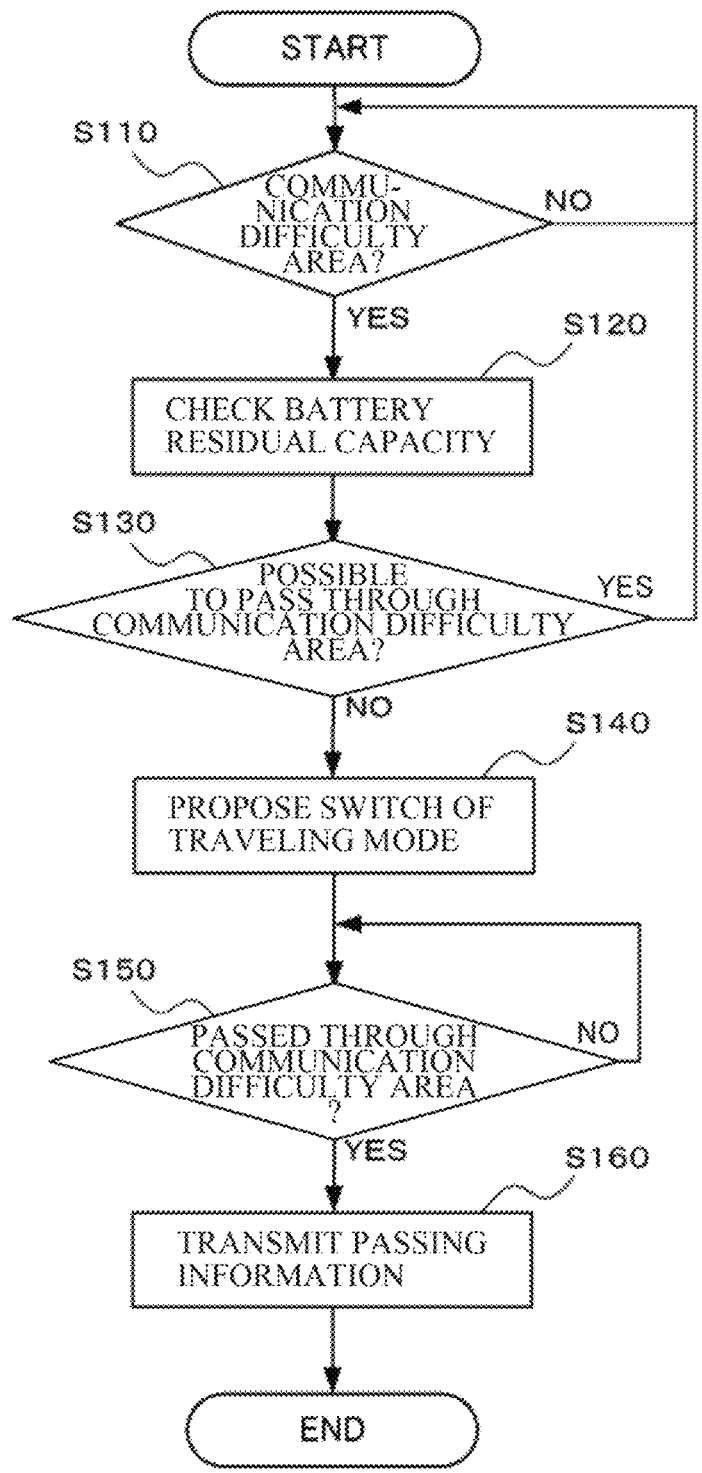
FIG. 4 is a flowchart of a process performed by the in-vehicle apparatus according to one example embodiment of the disclosure.

An exemplary process performed by the in-vehicle apparatus 10 according to the first example embodiment will now be described with reference to FIG. 4.

The travel information manager 115 may determine whether the communication difficulty area WR is located in the travel direction of the own vehicle V or on the traveling route RA based on the data received from the area information extractor 112 (Step S110).

When determining that the communication difficulty area WR is not located in the traveling direction of the own vehicle V or on the traveling route RA (Step S110: NO), the travel information manager 115 may repeat the process at Step S110.

In contrast, when determining that the communication difficulty area WR is located in the traveling direction of the own vehicle V or on the traveling route RA (Step S110: YES), the travel information manager 115 may check the traveling battery residual capacity BV of the own vehicle V based on the data received from the battery residual capacity monitor 113 (Step S120).

Based on the traveling battery residual capacity BV, the travel information manager 115 may calculate the possible traveling distance AD to determine whether it is possible for the own vehicle V to pass through the communication difficulty area WR (Step S130).

When determining that it is possible for the own vehicle V to pass through the communication difficulty area WR (Step S130: YES), the travel information manager 115 may return the process to Step S110.

In contrast, when determining that it is difficult for the own vehicle V to pass through the communication difficulty area (Step S130: NO), the travel information manager 115 may propose a switch of the traveling mode DM to the occupant via the notifier 130, based on the data received from the battery residual capacity monitor 113 (Step S140).

Thereafter, the travel information manager 115 may determine whether the own vehicle V has passed through the communication difficulty area WR (Step S150).

When determining that the own vehicle V has not passed through the communication difficulty area WR (Step S150: NO), the travel information manager 115 may repeat the process at Step S150.

In contrast, when determining that the own vehicle V has passed through the communication difficulty area WR (Step S150: YES), the travel information manager 115 may notify the occupant of the information indicating that the own vehicle V has passed through the communication difficulty area WR via the notifier 130 (Step S160), and may terminate the process.

Workings and Effects

As described above, the in-vehicle apparatus 10 of the vehicle control system 1 according to the first example embodiment includes the navigator 111 that acquires a current position of the own vehicle V, provides the map information MI on the surroundings of the current position of the own vehicle V, and guides the own vehicle V along the determined traveling route RA. The in-vehicle apparatus 10 further includes the area information extractor 112 that extracts the data on the communication difficulty area WR, which is an area in which the communication state TS is deteriorated, from the map information MI, the battery residual capacity monitor 113 that monitors the traveling battery residual capacity BV of the own vehicle V, and the traveling mode selector 114 that receives a selected traveling mode DM out of the traveling modes DM. The in-vehicle apparatus 10 further includes the travel information manager 115 that determines the communication state TS in the traveling direction of the own vehicle V based on the data received from the area information extractor 112 and calculates the possible traveling distance AD of the own vehicle V based on the selected traveling mode DM received by the traveling mode selector 114 and the traveling battery residual capacity BV. The in-vehicle apparatus 10 further includes the notifier 130 that notifies the occupant of the travel information DI on the own vehicle V. When determining that the own vehicle V is to travel in the communication difficulty area WR or that the communication difficulty area WR is located on the traveling route RA, the travel information manager 115 proposes the switch to the traveling mode DM in which the own vehicle V is able to pass through the communication difficulty area WR to the occupant via the notifier 130.

In addition, when determining that the own vehicle V has passed through the communication difficulty area WR based on the data received from the area information extractor 112, the travel information manager 115 notifies the occupant of the information indicating that the own vehicle V has passed through the communication difficulty area WR via the notifier 130.

That is, when determining that the own vehicle V is to travel in the communication difficulty area WR or that the communication difficulty area WR is located on the determined traveling route RA, the travel information manager 115 calculates the possible traveling distance AD of the own vehicle V and proposes the switch to the traveling mode DM in which the own vehicle V is able to pass through the communication difficulty area WR to the occupant. This enables the occupant to select one of the traveling modes DM effective to reduce the electric power consumption of the vehicle traveling battery BT.

Further, the travel information manager 115 notifies the occupant of the information indicating that the own vehicle V has passed through the communication difficulty area WR. This enables the occupant to select an appropriate traveling mode DM immediately after the own vehicle V passes through the communication difficulty area WR.

Accordingly, the electric power consumption of the vehicle traveling battery BT is reduced before the own vehicle V enters the communication difficulty area WR. It is therefore possible to avoid a situation in which the residual capacity of the vehicle traveling battery BT becomes insufficient.

Second Example Embodiment

An in-vehicle apparatus 10A according to a second example embodiment will now be described with reference to FIGS. 5 to 7.
<Vehicle Control System 1A>

Figure 5:
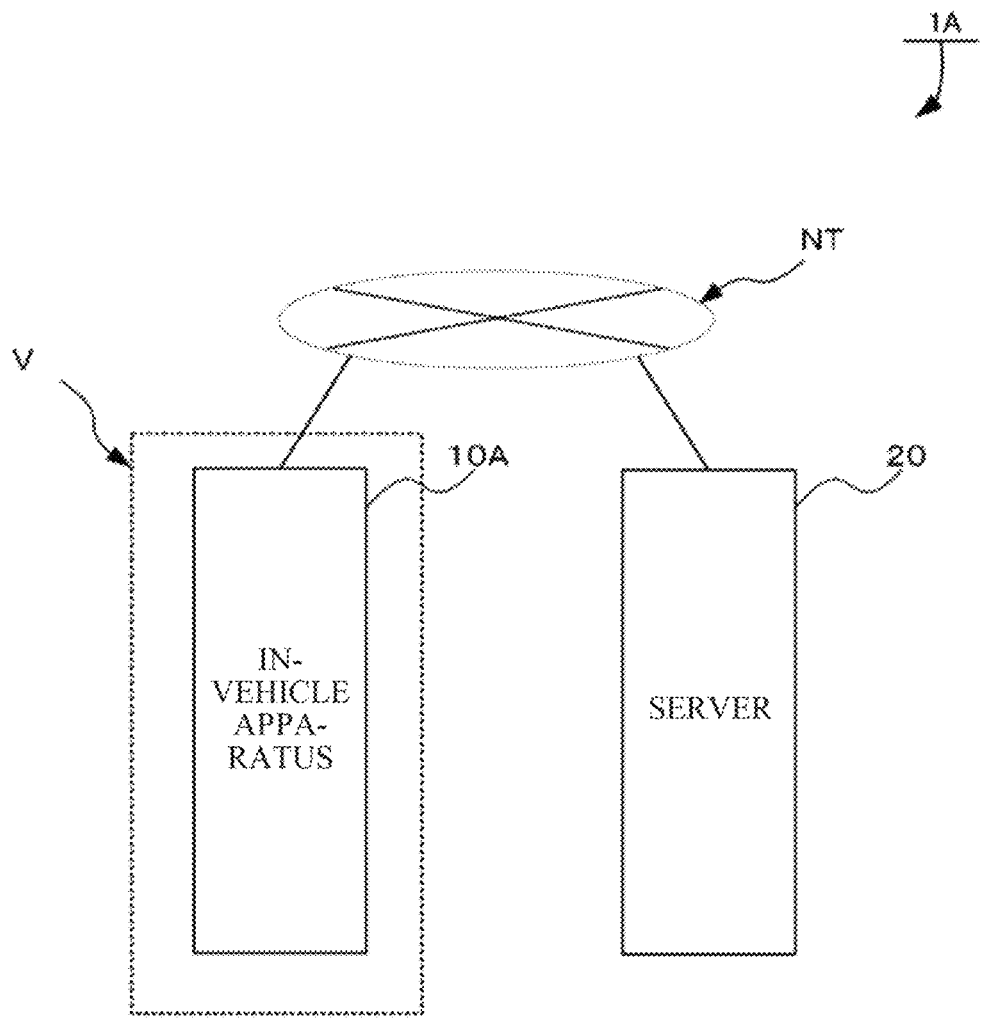
FIG. 5 is a diagram illustrating an exemplary configuration of a vehicle control system according to one example embodiment of the disclosure.

As illustrated in FIG. 5, a vehicle control system 1A according to the second example embodiment may include an in-vehicle apparatus 10A and the server 20.
<In-Vehicle Apparatus 10A>

Figure 6:
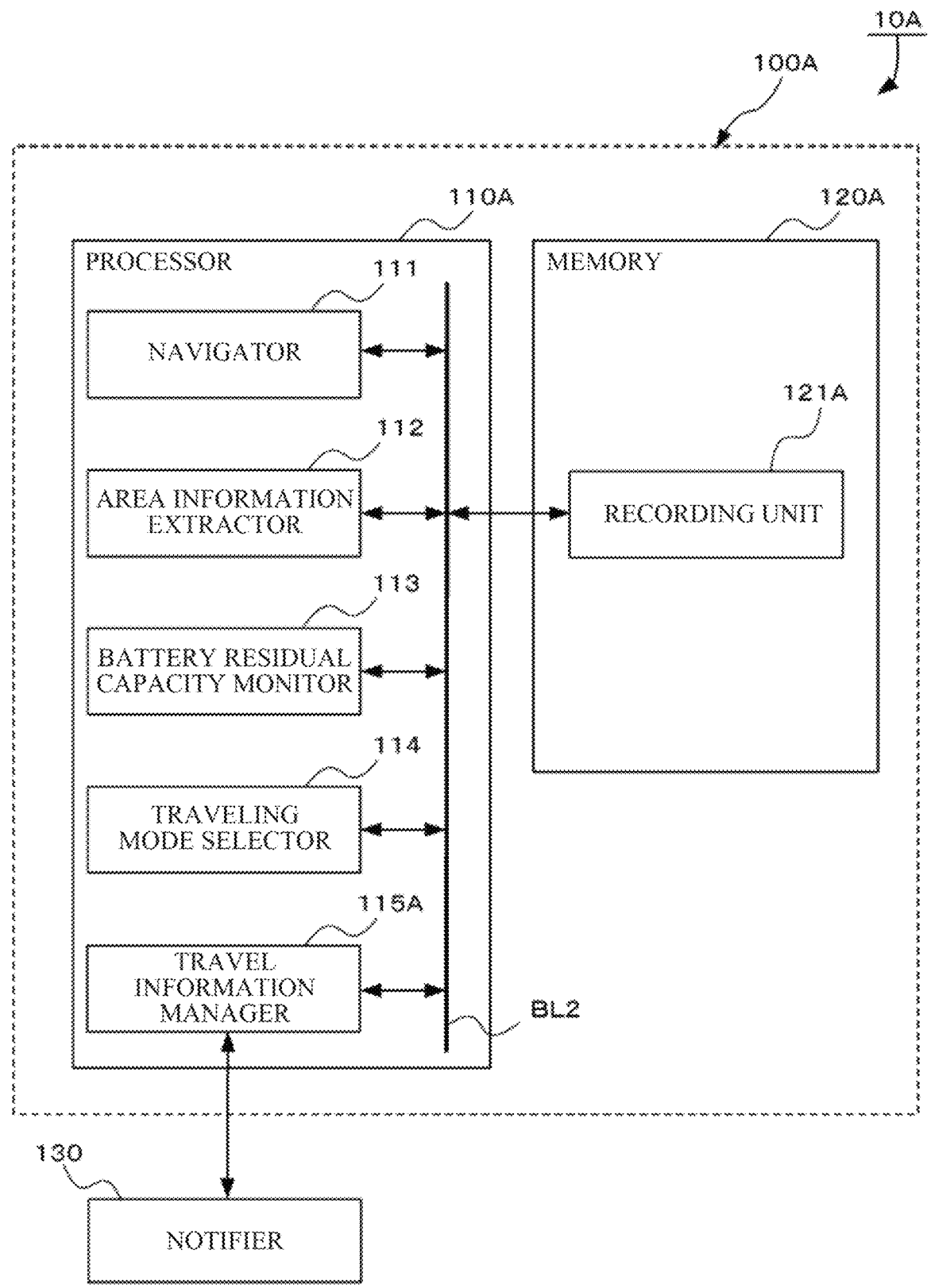
FIG. 6 is a diagram illustrating an exemplary configuration of an in-vehicle apparatus according to one example embodiment of the disclosure.
Figure 7:
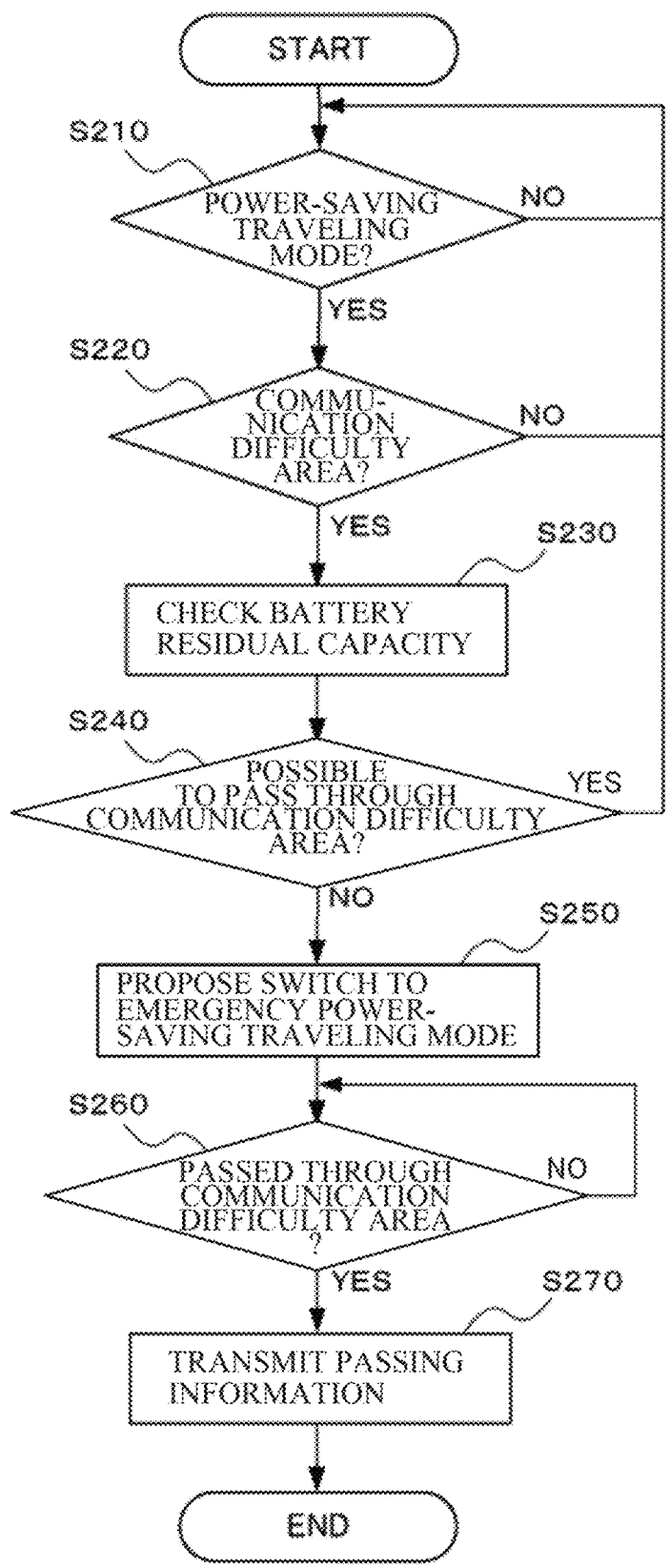
FIG. 7 is a flowchart of a process performed by the in-vehicle apparatus according to one example embodiment of the disclosure.

As illustrated in FIG. 6, the in-vehicle apparatus 10A may include a processor unit 100A and the notifier 130.
<Configuration of Processor Unit 100A>

The processor unit 100A may include a processor 110A and a memory 120A. The processor unit 100A may control an overall operation of the in-vehicle apparatus 10A based on a control program stored in a read-only memory (ROM) included in the memory 120A.

The processor 110A includes the navigator 111, the area information extractor 112, the battery residual capacity monitor 113, the traveling mode selector 114, and a travel information manager 115A. The memory 120A may include a recording unit 121A.

The navigator 111, the area information extractor 112, the battery residual capacity monitor 113, the traveling mode selector 114, and the travel information manager 115A in the processor 110A, and the memory 120A are coupled to each other via a bus line BL2.

When determining, upon selection of the power-saving traveling mode ED, that the own vehicle V is to travel in the communication difficulty area WR or that the communication difficulty area WR is located on the traveling route RA, and determining that it is difficult for the own vehicle V to pass through the communication difficulty area WR, the travel information manager 115A proposes a switch of the traveling mode DM to the emergency power-saving traveling mode EE to the occupant.

For example, the travel information manager 115A may determine whether the power-saving traveling mode ED is being selected based on the data received from the traveling mode selector 114, for example.

When determining that the power-saving traveling mode ED is being selected, the travel information manager 115A may calculate the possible traveling distance AD of the own vehicle V based on the traveling battery residual capacity BD, and may determine whether it is possible for the own vehicle V to pass through the communication difficulty area WR.

When determining that it is difficult for the own vehicle V in the power-saving traveling mode ED to pass through the communication difficulty area WR, the travel information manager 115A may propose a switch from the power-saving traveling mode ED to the emergency power-saving traveling mode EE via the notifier 130, for example.

<Process in In-Vehicle Apparatus 10A>

An exemplary process performed by the in-vehicle apparatus 10A according to the second example embodiment will now be described with reference to FIG. 7.

The travel information manager 115A may determine whether the power-saving traveling mode ED is being selected as the traveling mode DM based on the data received from the traveling mode selector 114 (Step S210).

When determining that the power-saving traveling mode ED is not being selected (Step S210: NO), the travel information manager 115A may repeat the process at Step S210.

In contrast, when determining that the power-saving traveling mode ED is being selected (Step S210: YES), the travel information manager 115A may determine whether the communication difficulty area WR is located on the traveling route RA determined as a taxiway to the destination or in the traveling direction of the own vehicle V (Step S220).

When determining that the communication difficulty area WR is not located on the traveling route RA or in the traveling direction of the own vehicle V (Step S220: NO), the travel information manager 115A may return the process to Step S210.

In contrast, when determining that the communication difficulty area WR is located on the traveling route RA or in the traveling direction of the own vehicle V (Step S220: YES), the travel information manager 115A may check the traveling battery residual capacity BV of the own vehicle V based on the data received from the battery residual capacity monitor 113 (Step S230).

Based on the traveling battery residual capacity BV, the travel information manager 115A may calculate the possible traveling distance AD to determine whether it is possible for the own vehicle V to pass through the communication difficulty area WR (Step S240).

When determining that it is possible for the own vehicle V to pass through the communication difficulty area WR (Step S240: YES), the travel information manager 115A may return the process to Step S210.

In contrast, when determining that it is difficult for the own vehicle V to pass through the communication difficulty area WR with the traveling battery residual capacity BV (Step S240: NO), the travel information manager 115A may propose a switch of the traveling mode DM from the power-saving traveling mode ED to the emergency power-saving traveling mode EE to the occupant via the notifier 130 (Step S250).

Thereafter, the travel information manager 115A may determine whether the own vehicle V has passed through the communication difficulty area WR (Step S260).

When determining that the own vehicle V has not passed through the communication difficulty area WR (Step S260: NO), the travel information manager 115A may repeat the process at Step S260.

In contrast, when determining that the own vehicle V has passed through the communication difficulty area WR (Step S260: YES), the travel information manager 115A may notify the occupant of the information indicating that the own vehicle V has passed through the communication difficulty area WR via the notifier 130 (Step S270), and may terminate the process.

Workings and Effects

According to the in-vehicle apparatus 10A of the second example embodiment described above, when determining, upon the selection of the power-saving traveling mode ED as the traveling mode DM, that the own vehicle V is to travel in the communication difficulty area WR in which the communication state TS is deteriorated or that the communication difficulty area WR is located on the determined traveling route RA, and determining that it is difficult for the own vehicle V in the power-saving traveling mode ED to pass through the communication difficulty area WR, the travel information manager 115A proposes the switch of the traveling mode DM to the emergency power-saving traveling mode EE to the occupant.

That is, when determining that it is difficult for the own vehicle V to pass through the communication difficulty area WR upon the selection of the power-saving traveling mode ED, the travel information manager 115A proposes the switch of the traveling mode DM from the power-saving traveling mode ED to the emergency power-saving traveling mode EE to the occupant. This enables the occupant to select the emergency power-saving traveling mode EE which is effective for the own vehicle V to pass through the communication difficulty area WR.

Accordingly, the electric power consumption of the vehicle traveling battery BT is reduced before the own vehicle V enters the communication difficulty area WR. It is therefore possible to avoid the situation in which the residual capacity of the vehicle traveling battery BT becomes insufficient.

Note that it is possible to implement the in-vehicle apparatus 10 or 10A according to the example embodiment of the disclosure by recording the process to be executed by the processor unit 100 or 100A on a non-transitory recording medium readable by a computer system, and causing the computer system to load the program recorded on the non-transitory recording medium onto the processor unit 100 or 100A to execute the program. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in detail with reference to the accompanying drawings, the configuration is not particularly limited to these example embodiments, and may include designs and the like within a range not departing from the gist of the disclosure.

According to one or more example embodiments of the disclosure, it is possible to avoid the situation in which the residual capacity of the vehicle traveling battery becomes insufficient by reducing the electric power consumption of the vehicle traveling battery in advance before the own vehicle enters the communication difficulty area.

The invention claimed is:

1. An in-vehicle apparatus to be applied to a vehicle, the in-vehicle apparatus comprising:
   a navigator configured to acquire a current position of the vehicle, provide map information on surroundings of the current position of the vehicle, and guide the vehicle along a determined traveling route;
   an area information extractor configured to extract data on a communication difficulty area included in the map information, the communication difficulty area comprising an area in which a communication state is deteriorated;
   a battery residual capacity monitor configured to monitor a traveling battery residual capacity of the vehicle;
   a traveling mode selector configured to receive a selected traveling mode out of traveling modes;
   a travel information manager configured to determine the communication state in a traveling direction of the vehicle based on the data received from the area information extractor, and calculate a possible traveling distance of the vehicle based on the selected traveling mode received by the traveling mode selector and the traveling battery residual capacity received from the battery residual capacity monitor; and
   a notifier configured to notify an occupant of travel information on the vehicle received from the travel information manager, wherein,
   the travel information manager is configured to
   when determining that the vehicle is to travel in the communication difficulty area or that the communication difficulty area is located on the determined traveling route, propose a switch to another of the traveling modes in which the vehicle is able to pass through the communication difficulty area to the occupant via the notifier,
   when determining that the vehicle has passed through the communication difficulty area based on the data received from the area information extractor, notify the occupant of information indicating that the vehicle has passed through the communication difficulty area via the notifier, and
   when determining, upon selection of a power-saving traveling mode in which electric power consumption of an electrical device in the vehicle is reduced as the selected traveling mode, that the vehicle is to travel in the communication difficulty area or that the communication difficulty area is located on the determined traveling route, and determining that it is difficult for the vehicle in the power saving traveling mode to pass through the communication difficulty area, propose a switch from the power-saving traveling mode to an emergency power-saving traveling mode in which the electric power consumption of the electrical device in the vehicle is further reduced.

2. An in-vehicle apparatus to be applied to a vehicle, the in-vehicle apparatus comprising:
   one or more processors;
   one or more memories communicably coupled to the one or more processors; and
   a notifier configured to notify an occupant of the vehicle of travel information on the vehicle,
   the one or more memories comprising a recording unit configured to record map information on routes, the map information including data on a communication difficulty area in which a communication state is deteriorated,
   the one or more processors comprising
     a navigator configured to acquire a current position of the vehicle, provide map information on surroundings of the current position of the vehicle, and guide the vehicle along a determined traveling route,
     an area information extractor configured to extract the data on the communication difficulty area included in the map information,
     a battery residual capacity monitor configured to monitor a traveling battery residual capacity of the vehicle,
     a traveling mode selector configured to receive a selected traveling mode out of traveling modes, and
     a travel information manager configured to determine the communication state in a traveling direction of the vehicle based on the data received from the area information extractor, and calculate a possible traveling distance of the vehicle based on the selected traveling mode received by the traveling mode selector and the traveling battery residual capacity received from the battery residual capacity monitor, wherein
   the travel information manager is configured to
   when determining that the vehicle is to travel in the communication difficulty area or that the communication difficulty area is located on the determined traveling route, propose a switch to another of the traveling modes in which the vehicle is able to pass through the communication difficulty area to the occupant via the notifier,
   when determining that the vehicle has passed through the communication difficulty area based on the data received from the area information extractor, notify the occupant of information indicating that the vehicle has passed through the communication difficulty area via the notifier, and
   when determining, upon selection of a power-saving traveling mode in which electric power consumption of an electrical device in the vehicle is reduced as the selected traveling mode, that the vehicle is to travel in the communication difficulty area or that the communication difficulty area is located on the determined traveling route, and determining that it is difficult for the vehicle in the power saving traveling mode to pass through the communication difficulty area, propose a switch from the power-saving traveling mode to an emergency power-saving traveling mode in which the electric power consumption of the electrical device in the vehicle is further reduced.

* * * * *